A. L. GETTYS & A. E. HITESHEW.
FLYING MACHINE.
APPLICATION FILED SEPT. 23, 1911.

1,052,334.

Patented Feb. 4, 1913.

Witnesses
D. B. Galt.
C. C. Hines

Inventors
Albert L. Gettys
Alton E. Hiteshew.
By Victor J. Evans
Attorney

A. L. GETTYS & A. E. HITESHEW.
FLYING MACHINE.
APPLICATION FILED SEPT. 23, 1911.

1,052,334.

Patented Feb. 4, 1913.

Witnesses
D. B. Galt.
C. C. Hines.

Inventors
Albert L. Gettys
Alton E. Hiteshew.
By Victor J. Evans
Attorney

UNITED STATES PATENT OFFICE.

ALBERT L. GETTYS AND ALTON E. HITESHEW, OF JOHNSTOWN, PENNSYLVANIA.

FLYING-MACHINE.

1,052,334. Specification of Letters Patent. Patented Feb. 4, 1913.

Application filed September 23, 1911. Serial No. 650,900.

*To all whom it may concern:*

Be it known that we, ALBERT L. GETTYS and ALTON E. HITESHEW, citizens of the United States, residing at Johnstown, in the county of Cambria and State of Pennsylvania, have invented new and useful Improvements in Flying-Machines, of which the following is a specification.

This invention relates to improvements in flying machines, and particularly to flying machines of the monoplane type.

The object of the invention is to provide a flying machine in which the parts are so mounted and disposed as to secure a low center of gravity, and in which the construction is such as to insure an effective degree of inherent lateral and longitudinal stability.

A further object of the invention is to provide means under the control of the aviator for maintaining the longitudinal equilibrium of the machine under varying conditions of service, and to provide a novel construction and arrangement of manually controlled steering and stabilizing devices adapted to be adjusted through defined operations of a single controlling device.

A further object of the invention is to provide a novel arrangement of lifting propellers whereby the machine may be started in flight without a preliminary run, supported in the air in a stationary position so as to hover over any given point, and sustained to regulate its descent in making a landing, whereby greater convenience and safety in the operation of such machines is secured.

A still further object of the invention is to provide wings or supporting surfaces mounted for vertical movement and for operation in conjunction with pressure equalizing planes and connecting means, whereby when either plane is subjected to the pressure of disturbing currents of air and is deflected from its normal position, the wing coöperating therewith will be moved upward to a corresponding extent and motion will be transmitted to the opposite plane and wing to adjust the same to equal degrees, through which adjustments the air pressures upon the wing surfaces will be equalized and a restoration of the machine to its normal balance effected.

A further object of the invention is to provide a stabilizing vane connected for automatic adjustment with the wings and equalizing planes to secure a lifting action of the air on the machine to assist in restoring the lateral balance, said vane being further adapted for use in properly banking the machine in making a turn, whereby the machine may be automatically banked to the proper degree for the turning movement.

With these and other objects in view, the invention consists of the features of construction, combination and arrangement of parts, hereinafter fully described and claimed, reference being had to the accompanying drawings, in which—

Figure 1:
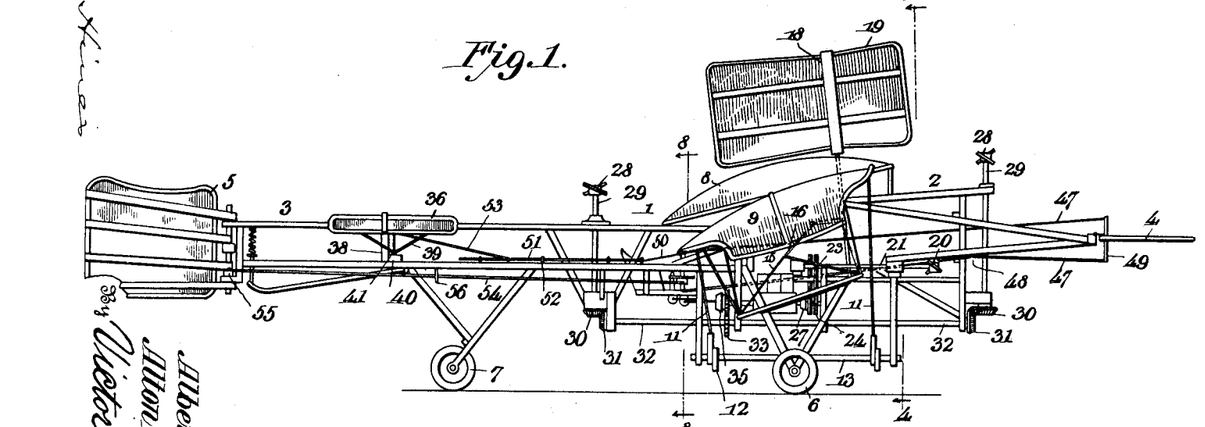
Figure 1 is a side elevation of a flying machine embodying our invention.
Figure 2:
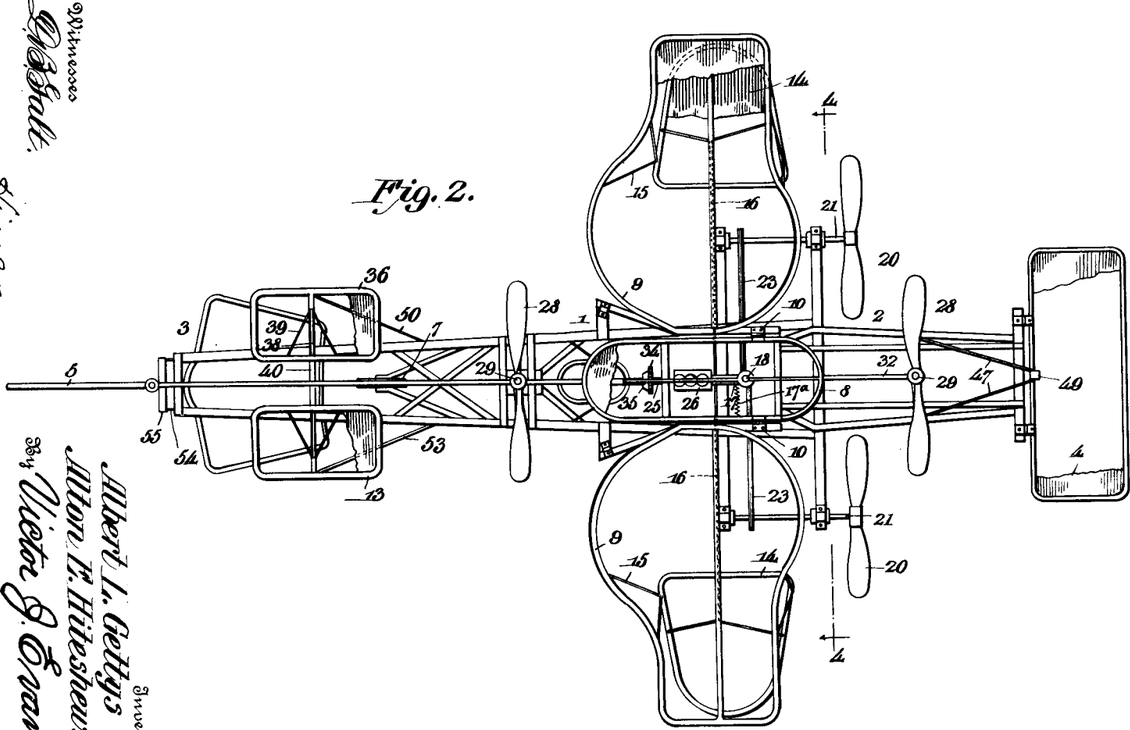
Fig. 2 is a top plan view of the same.
Figure 3:
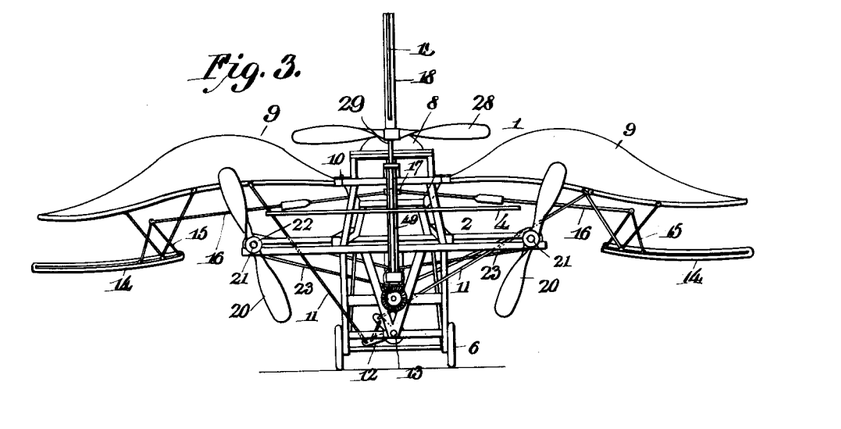
Fig. 3 is a front elevation of the machine.
Figure 4:
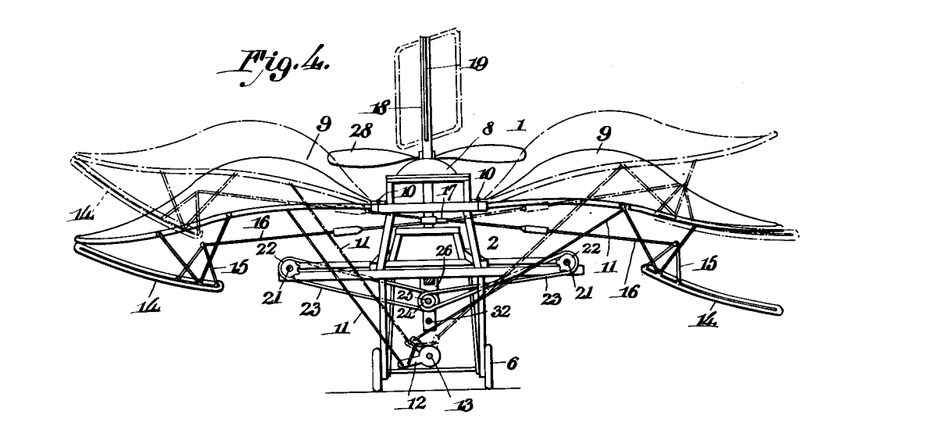
Fig. 4 is a sectional front elevation on line 4—4 of Fig. 2, showing in full and dotted lines the wings, pressure equalizing planes, and stabilizing vane in their different positions of adjustment.
Figures 5, 6:
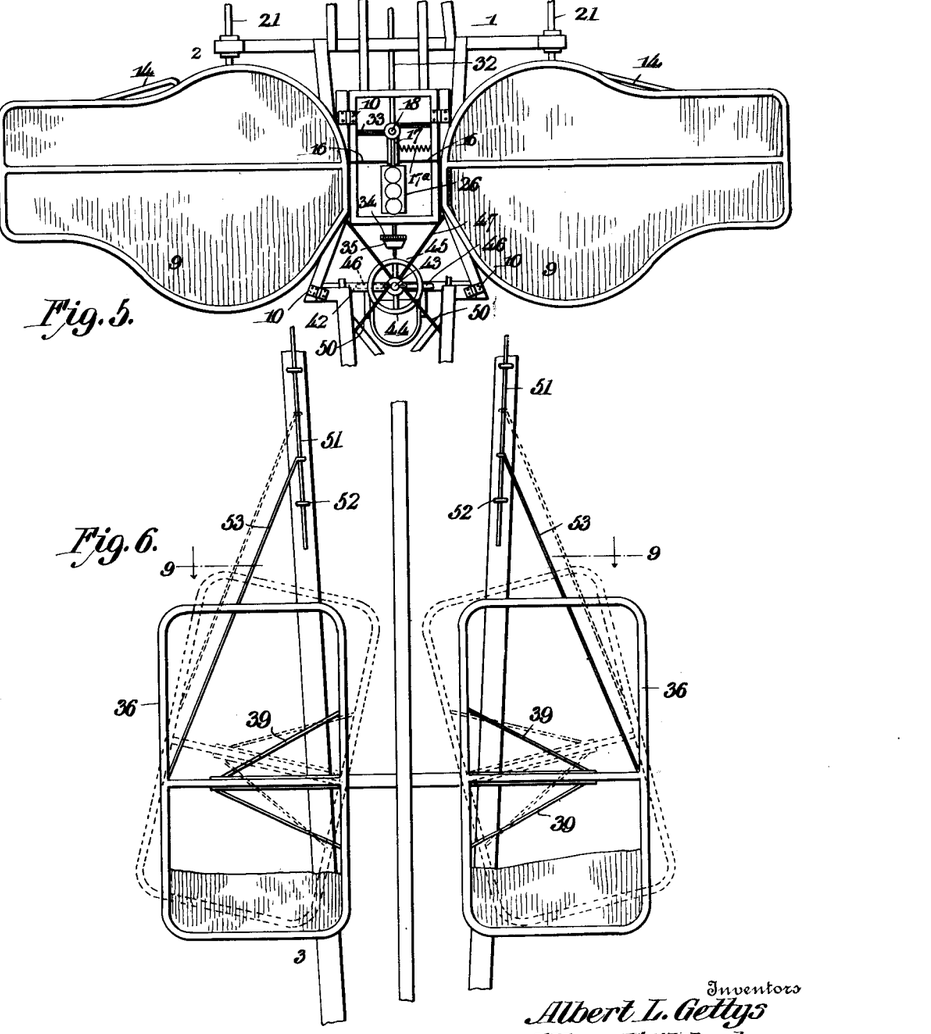
Fig. 5 is an enlarged top plan view of the main frame and supporting surfaces.
Fig. 6 is a similar view of the tail portion of the machine.
Figure 7:
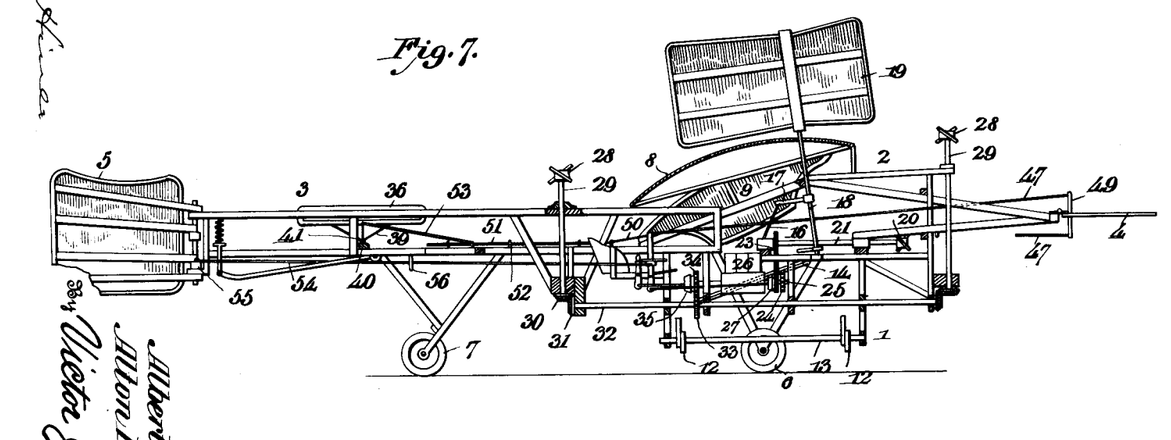
Fig. 7 is a central vertical longitudinal section through the machine.
Figure 8:
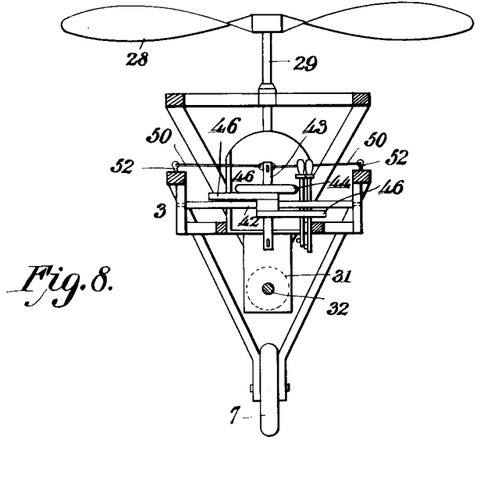
Fig. 8 is a vertical transverse section on line 8—8 of Fig. 1.
Figure 9:
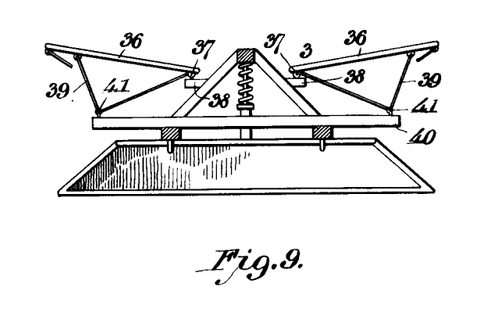
Fig. 9 is a vertical transverse section on line 9—9 of Fig. 6.
Figure 10:
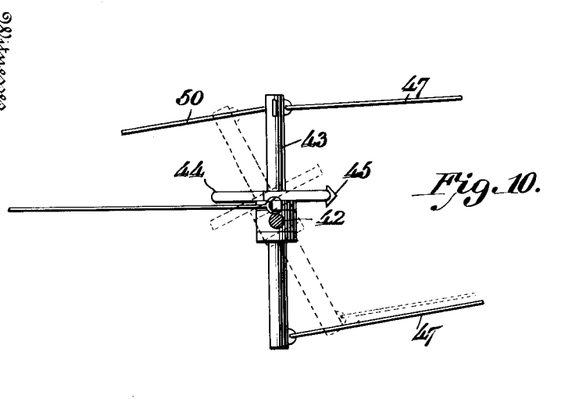
Figs. 10 and 11 are sectional views through the steering and controlling device.
Figure 11:
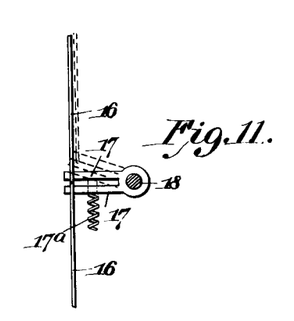
Figure 12:
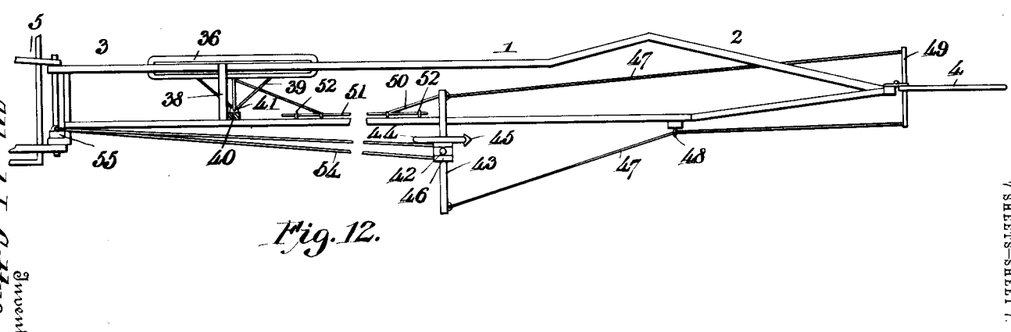
Fig. 12 is a diagrammatic view of the steering and controlling elements.

Referring to the drawings, 1 designates the body or main frame of the machine, having a short forwardly extending head frame 2 and a relatively longer tail frame 3, said head and tail frames respectively supporting horizontal and vertical rudders 4 and 5. Suitably arranged upon the body and tail frame are launching and landing wheels 6 and 7, which may be constructed and mounted in any suitable manner.

Mounted upon the top of the body is a hood or central supporting surface 8, which is of concavo-convex form and extends lengthwise in the line of flight, said surface having its concaved side facing downwardly and being parabolically or otherwise curved between its front and rear edges, whereby said surface is caused to form an air channel as well as a supporting element to secure an effective dynamical reaction of the air, as well as to prevent lateral deflection of the machine from its course.

Disposed on opposite sides of the hood 8 are wings or main supporting surfaces 9, arranged below the plane of the hood and hinged or pivoted to the main frame, as at 10, for movement in a vertical plane. Each of these wings 9 is curved or inclined from front to rear and tapers toward its free end, the body portion of each wing being of concave-convex form, so as to provide an air receiving pocket upon the under side thereof. This construction curves the plane both longitudinally and transversely, so as to obtain a supporting action thereon similar to the action of the air upon the wing of a bird. The wings 9 are pivotally connected by pitman rods 11 with crank arms 12 upon a longitudinally extending rock shaft 13 journaled upon the base of the main frame, the said crank arms being so arranged as to maintain the two wings at all times in the same relative positions. In other words, the construction and arrangement of the parts is such that upon an uptilting movement of either wing from its normal position a corresponding adjusting movement will be automatically imparted to the other wing.

Arranged below the tip of each main wing is a pressure equalizing plane 14, flexibly suspended at its inner end from the frame of the superposed main wing by a series of links or other flexible connections 15, adapted to permit said plane to fold upwardly against the main plane under wind pressure, when such pressure exceeds a predetermined pressure. Said pressure equalizing planes are connected by pitman rods 16 with crank arm 17 upon a vertical staff or shaft 18 carrying a vertical stabilizing plane or vane 19, and are normally maintained a predetermined distance below the main plane or wing by coiled resistance springs 17ᵃ (one or more) connected with the main frame and said crank arm 17. The shaft 18 is mounted to turn laterally in either direction in suitable bearings, and when the machine is laterally balanced the vane 19 stands vertically and parallel with the line of flight, in which position it operates strictly as a stabilizer coacting with the hood 8 to prevent the machine from skidding or drifting laterally from its course under the pressure of side gusts of wind. When the supporting surface at either side of the machine is subjected to excess air pressure upon the under side thereof, whereby such side tends to tilt upwardly and disturb the lateral balance of the machine, the air pressure first acting upon the pressure equalizing plane at that side moves the same upwardly to a greater or less extent. In thus moving upwardly the equalizing plane transmits the thrust pressure of the air to the coacting main wing, which tilts upward to a greater or less degree and transmits motion through the connections described to the opposite wing, by which the two wings will be adjusted to corresponding positions. It will, therefore, be apparent that when the lateral balance of the machine is disturbed by excess air pressure at either side, the equalizing wing and plane at the side subjected to excess pressure in moving upwardly under the disturbing force will effect the automatic adjustment of the main wing at the opposite side of the machine, so that the two wings will be arranged dihedrally at the same angle of incidence, by which the wings will be shifted to accommodate themselves to the variation of pressure, so that the lateral balance of the machine will remain undisturbed, or, if the lateral balance is disturbed to any degree, the compensating adjustment of the wings will quickly right the machine and restore the lateral balance. The pressure equalizing planes 14 in their upward and downward movements also adjust each other to corresponding positions relative to the main wings, and at the same time turn the shaft 18 so as to shift the vane 19 laterally in one direction or the other to lie broadside in the path of the wind traveling parallel with the line of flight. By this means the vane is always caused to present its broad side toward that side of the machine which is depressed or tends to tilt downward, so that the air will exert a lifting action thereon to assist in elevating the depressed side. The vane is also adjusted in the proper direction to assist in banking the machine when making a turn either to the right or left, and to prevent the short-turning side of the machine from moving forwardly as rapidly as the long-turning side, by which a sensitive steering control in either lateral direction is obtained, as will be readily understood.

Driving propellers 20 are arranged at the front of the machine on opposite sides of the longitudinal center thereof and are mounted upon the forward ends of longitudinal shafts 21 carrying sprocket wheels 22 driven by chains 23 from a double sprocket wheel 24 on the forward end of the shaft 25 of a driving motor 26, said motor being centrally disposed within the body 1 at such a point that its weight will assist in maintaining a low head center or center of gravity. One of the chains 23 is crossed, so that the two propellers 20 will be driven in opposite directions, and the gear 24 is loosely mounted on the motor shaft and is adapted to be thrown into and out of engagement therewith by a friction clutch 27.

Disposed at the front and rear of the main frame are lifting propellers 28 mounted upon vertical shafts 29 journaled on the head and tail frame, which shafts carry at their lower ends beveled gears 30 meshing with similar gears 31 on a longitudinally extending transmission shaft 32. Carried by the shaft 32 is a spur gear 33 meshing with a similar gear 34 on the rear end of the motor shaft 25, whereby the lifting propellers are driven. The gear 34 is loose on the motor shaft and a friction clutch 35 is provided for throwing it into and out of action, so that the driving and lifting propellers may be simultaneously or independently employed at the will of the aviator. The lifting propellers are used for elevating the machine straight up from the ground and when the desired elevation is reached may be thrown out of action or driven at reduced speed to serve as auxiliary sustainers. They may also be employed to sustain the machine at a stationary point in the air and to regulate the speed of descent of the machine.

Mounted upon the tail frame at a suitable point in advance of the rudder 5 are supplementary horizontal rudders and balancing planes 36, for controlling and maintaining the longitudinal equilibrium. These planes 36 are arranged on opposite sides of the longitudinal center of the machine and inclined at an angle outwardly and upwardly from their inner edges so as to form supporting surfaces to sustain the weight of the tail frame when the machine is in flight. Each plane is hinged or pivoted at its inner edge, as shown at 37, to a cross piece 38, and is supported beyond the frame by a system of braces 39 pivotally connected with a cross bar 40, as at 41, the hinges or pivots 37 and 41 permitting the planes to tilt vertically on axes inclined to the horizontal so as to secure an effective lifting or depressing effect.

Mounted upon the main frame is a horizontal transverse bracket or shaft 42 pivotally supported to tilt in a fore and aft direction. Journaled in this bracket or shaft 42 is a vertical rod or shaft 43, adapted to be turned laterally in either direction by a hand wheel or lever 44 provided with an indicating pointer 45, designed to indicate the direction of movement of the machine upon the adjustment of the lever to any of its steering positions, and also to indicate the proper position of the lever when the machine is in a straight course of travel. Through the use of this indicator the operator is at all times enabled to correctly determine the course of travel of the machine and the extent of adjustment of the lever required for any steering action. Secured to the upper and lower ends of the vertical rod or shaft 43 are laterally extending arms 46. Wires 47 pass through suitable guides 48 and connect the upper and lower ends of the shaft 43 with crank arms 49 attached to the shaft or axis of the front horizontal rudder 4, so that through a fore and aft tilting motion of the steering mechanism above described said rudder may be adjusted. Connected with the upper end of the shaft 43 are link rods 50 which couple said shaft with sliding rods or tubes 51 movable in guides 52 and which are connected with the rudders and balancing planes 36 by lines 53, whereby a fore and aft tilting motion of the steering mechanism will also effect the adjustment of said planes 36 in unison with the rudder 4. Wires 54 are connected with crank arms 55 on the shaft or axis of the vertical rudder 5 and pass through suitable guides 56 and are also connected with the arms 46 of the steering device, whereby said vertical rudder may be adjusted through a turning motion of the rod or shaft 43. It will thus be seen that all of the steering elements may be controlled from a single steering or controlling device, and that this device enables a combination of movements to be secured to steer the machine simultaneously in two directions, as well as to bank the machine accurately in making turns.

From the foregoing description, taken in connection with the accompanying drawings, the construction and mode of operation of our improved flying machine will be readily understood, and it will be seen that simple and effective means are provided for lifting the machine directly from the ground and sustaining it in the air at any desired elevation without forward motion, as well as for graduating and controlling its speed of descent to the ground. It will also be seen that the invention provides a construction of supporting surfaces for securing an effective lifting action, a construction of steering gear which give the aviator ready and complete control over the machine, and a construction of means responsive quickly to variations of air pressure at the opposite sides of the machine for automatically maintaining the lateral balance.

Having thus described the invention, what we claim as new is:

1. In a flying machine, the combination of a main frame carrying a supporting surface and provided with head and tail frames, upright shafts upon the head and tail frames, lifting propellers carried by said shafts in substantial horizontal alinement with the supporting surface and adjacent to and respectively in front and rear thereof, a motor mounted upon the main frame and having its shaft extending longitudinally in the central line thereof, a longitudinally extending drive shaft journaled on the main frame below the motor, beveled gearing between the respective ends of said drive shaft and the lower ends of the respective upright shafts, gearing between the motor shaft and the drive shaft, a clutch device for throwing said gearing into and out of action, longitudinally extending propeller shafts arranged above the motor and on opposite sides of the longitudinal line thereof, driving propellers carried by said propeller shafts, sprocket gearing between the motor shaft and the respective longitudinally extending propeller shafts, and a clutch for throwing said gearing into and out of action.

2. In a flying machine, a supporting surface comprising a pair of laterally extending wings, each wing being of diminished width at its outer portion and of approximately circular outline at its inner portion, the body of each wing being longitudinally and transversely curved, the concavity of each wing gradually increasing in depth from the margins of the wing toward the outer portion of the substantially circular inner end of the wing.

3. A flying machine including a horizontal rudder, a vertical rudder, a tubular bracket provided with lateral trunnions and mounted to tilt thereon in a fore and aft direction, a vertical shaft journaled in said bracket to turn laterally in either direction, said shaft extending above and below the bracket, laterally extending arms carried by said shaft, connections between said laterally extending arms and the vertical rudder, a pair of vertically tilting balancing planes, connections between said planes and the shaft for imparting opposite tilting motions to said planes on opposite tilting motions of the shaft and bracket, connections between the upper and lower portions of the shaft and the horizontal rudder, and an operating lever fixed to the shaft and normally extending horizontally in a fore and aft direction, whereby said shaft may be tilted or turned, said lever being provided with a forwardly extending indicating arm adapted for coöperation with a portion of the frame to indicate when the lever and bracket are in normal position or out of normal position either vertically or horizontally.

4. In a flying machine, a frame structure, a pair of balancing planes arranged on opposite sides of the longitudinal axis of the frame structure, said planes being normally angled upwardly and outwardly, each of said planes having a fixed pivot at its inner edge and a movable pivot outwardly beyond the fixed pivot, whereby said planes are adapted to tilt vertically and simultaneously swing at an angle transversely to the line of flight, and means for operating said planes in unison.

5. In a flying machine, a frame structure, a pair of balancing planes arranged at opposite sides of the longitudinal axis of the frame structure, said planes being normally angled upwardly and outwardly and pivoted to tilt vertically and simultaneously shift laterally, rods slidable longitudinally of the frame structure, connecting elements between said rods and balancing planes, and means for simultaneously sliding the rods forwardly or rearwardly.

6. In a flying machine, a frame, a supporting surface comprising a pair of wings hinged or pivoted at their inner edges to tilt vertically, a horizontally longitudinally extending rock shaft provided with crank arms, and links connecting the respective wings with the respective crank arms, whereby when either wing tilts upwardly under air pressure the other wing will be tilted upwardly to a corresponding degree.

7. In a flying machine, a supporting surface comprising a pair of vertically tilting wings, a laterally movable balancing vane arranged at a point between the wings, pressure equalizing planes disposed below and yieldingly connected with the wings, connections between the wings for adjusting said wings to equal degrees upon the upward movement of either wing under air pressure, and connections between said pressure equalizing planes and the balancing vane for adjusting said vane and adjusting the equalizing planes to corresponding degrees upon the upward movement of either equalizing plane under air pressure.

8. In a flying machine, a supporting surface comprising a pair of vertically tilting wings, vertically movable pressure equalizing planes disposed below the wings and flexibly connected therewith, a laterally movable balancing vane centrally positioned between the wings, crank and pitman connections between the wings for adjusting said wings to equal degrees when either wing tilts upwardly under air pressure, and crank and pitman connections between the equalizing planes and the balancing vane for shifting said vane in one direction or the other and adjusting the equalizing planes to equal degrees upon the upward movement of either equalizing plane under air pressure.

9. In a flying machine, a supporting surface comprising a pair of vertically tilting wings, a laterally movable balancing plane arranged at a point between the wings, means operative when either wing tilts upwardly under air pressure to tilt the other wing upwardly to a like degree, and means operative for simultaneously adjusting said vane in one direction or the other.

10. In a flying machine, a frame, a pair of vertically tilting wings, vertically movable pressure equalizing planes disposed beneath the wings, means operated by an upward movement of each wing under air pressure to adjust the other wing upward to a like degree, a lateral movable balancing plane disposed between the wings, and means actuated by the pressure equalizing planes for shifting said vane.

In testimony whereof we affix our signatures in presence of two witnesses.

ALBERT L. GETTYS.
ALTON E. HITESHEW.

Witnesses:
FRANK HEGUE,
HARRY E. SLICK.